July 5, 1938.  W. W. WINDLE  2,122,545
WOOL DUSTER
Filed Jan. 25, 1937
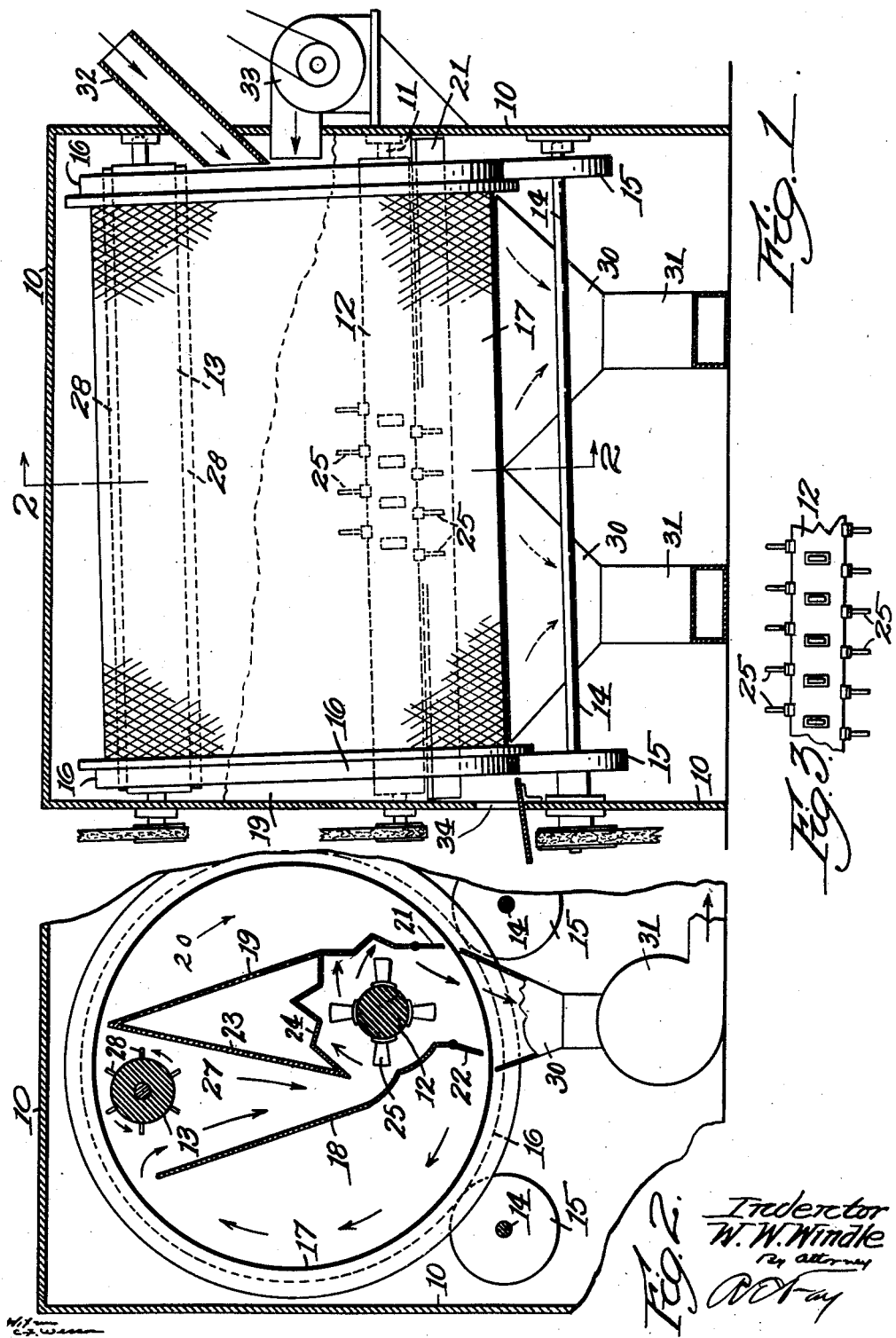
Inventor
W. W. Windle
by attorney Patented July 5, 1938

2,122,545

UNITED STATES PATENT OFFICE 2,122,545

WOOL DUSTER

Winfred W. Windle, Millbury, Mass.

Application January 25, 1937, Serial No. 122,165

7 Claims. (Cl. 19—90)

This invention relates to a machine for separating dust and extraneous matters from wool, cotton and other fibres, whether in loose or manufactured form. It may be applied for the dusting of dirt and carbonized cotton from woolen rags or for dusting out foreign material from cotton. It is intended to remove burrs, vegetable fibre and some grease as well as to break up clods in wool on carbonized materials, carbonized vegetable matter, etc.

The principal objects of the invention are to provide a restricted path inside the screen cage down which the fibres will travel to a beater which will throw them against a surface that will break up and/or shake loose foreign matters; to provide means at the top of the screen cage to assist in directing the fibres down to the beater and which in itself acts as a beater to provide some preliminary separation of the fibres and dirt; to provide a hopper for receiving the dirt and dust through the meshes of the screen cage; to provide blowers or fans for carrying the fibres through the screen cage longitudinally and driving out the fibres and dust discharged from the cage, and, more specifically, to provide a partition in the screen cage under which the rotation of the cage will carry the fibres and over the top of which it will also carry them and a hopper arrangement adjacent thereto for receiving them.

Other objects and advantages of the invention will appear hereinafter.

Reference is to be had to the accompanying drawing, in which

Fig. 1 is a side view of a preferred embodiment of this invention showing the supporting casing in section;

Fig. 2 is a sectional view of the same on the line 2—2 of Fig. 1, and

Fig. 3 is a plan of a part of the main feature.

This invention preferably is applied to a casing 10 which surrounds substantially all the parts of the device and supports them. This casing carries a shaft 11 driven by power and carrying the main beater 12 and a shaft driven by power for rotating the upper beater 13 having radial pins 28. It is also provided with shafts 14 driven by power which are provided with supporting and propelling wheels 15 engaging a circular track 16 on a screen case 17 and rotating the same. The two beaters are located in the cage but supported independently thereof by bearings carried by the casing.

Supported by the casing are two partitions 18 and 19. The partition 18 is important in this invention on account of the mode of operation that will be described. The partition 19 separates the space 20 from the rotary screen except at the top and bottom and behind it is a dead space. It is not intended for any fibres to get into it. If they do get into it, they will move down to the bottom by gravity and the action of the screen and there is a freely hinged gate 21 at the bottom to let them through. There is a similar gate 22 at the bottom of the partition 18. This partition 18 forms, with a stationary wall 23, a hopper for receiving and feeding down the fibre. The space between the partitions 19 and 23 is also a vacant and dead air space, being completed at the bottom by a wall 24. This wall is of a jagged shape being made up of parts having every alternate one in a position to receive clods thrown directly against it by the pins 25 of the beater 12. This wall 24 constitutes the top of a roughly circular or cylindrical space at the bottom of the hopper 27 which has been mentioned. This space receives the fibre from the hopper through a passage at the bottom of the hopper.

The beater 12 on the shaft 11 is provided with a helically arranged row of pins 25, each of these pins being flat, and consequently strong, and placed at an angle to the helix. The purpose of these pins is to throw the fibre and clods against the surfaces of the wall 24 which are perpendicular to them, as indicated by the arrows, and to break up and/or separate the extraneous material from the fibre being dusted. The clods and fibres drop down between the two doors 21 and 22 and the dust, dirt, and any other fine particles, sift through the meshed cylindrical wall of the cage into a pair of hoppers 30. These hoppers feed down into exhaust fans 31 which assist gravity in drawing the dust and dirt out of the cage and discharge it as a waste product.

In the operation of the device the cage rotates constantly in the direction indicated by the arrows in Fig. 2. The fibre is brought in at one end through a hopper 32 and forced into and through the hopper by a blower 33 so that it passes through the hopper longitudinally. It passes out through an outlet 34.

It will be noted that the cage is located at a slight angle, the lower end being at the exhaust end to assist in the passage of the fibre through the cage and be discharged therefrom. During the course of the fibre through the cage it is brought around back to the top of the cage a plurality of times so that it gets its action through the beaters 13 and 12 over and over again. By the time it reaches its last turn around in the cage and approaches the outlet it has been beaten and sifted over and over again. The beater 13 is mainly for stopping the fibre going much past the partition 18 and assisting gravity in forcing it along the wall 18 and down through the hopper 27.

It will be seen, therefore, that the fibre is concentrated during its passage downwardly inside the cage and thus subjected more efficiently than has been the case heretofore to the action of the beaters, particularly the beater 12. Also, there is no opposition to the passage of the fibres around the inside surface of the rotary screen cage and most all of the dust and dirt that is loosened at any point where it rests on the bottom of the cage is discharged through it into the hoppers 30. It is a comparatively inexpensive machine to make in view of the advantages it secures.

Having thus described my invention and the advantages thereof, I do not wish to be limited to the details herein disclosed, otherwise than as set forth in the claims, but what I claim is:

1. In a dusting machine for loose fibre, the combination of a rotary screen cage for receiving the fibre at one end and discharging it at the other, a stationary hopper at the top of the cage for receiving the fibre carried up into its top by the rotation of the cage, an enclosure opening out of the bottom of the hopper for receiving the contents thereof, a rotary beater in said enclosure for breaking up the clods, and an outlet at the bottom of said enclosure for depositing the fibre on the bottom of the cage and discharging the dust through the meshes of the cage.

2. In a dusting machine for loose fibre, the combination of a rotary screen cage for receiving the fibre at one end and discharging it at the other, a stationary hopper at the top of the cage and extending the length of the cage for receiving the fibre carried up into its top by the rotation of the cage, an enclosure opening out of the bottom of the hopper for receiving the contents thereof, a rotary beater in said enclosure, a jagged top for said enclosure for breaking up the clods, and an outlet at the bottom of said enclosure for depositing the fibre on the bottom of the cage and discharging the dust through the meshes of the cage.

3. In a dusting machine for loose fibre, the combination of a rotary screen cage for receiving the fibre at one end and discharging it at the other, a blower at the receiving end of the cage for charging the cage with fibre, a stationary hopper at the top of the cage for receiving the fibre carried up into its top by the rotation of the cage, an enclosure opening out of the bottom of the hopper for receiving the contents thereof, a rotary beater in said enclosure for breaking up the clods, an outlet at the bottom of said enclosure for depositing the fibre on the bottom of the cage and discharging the dust through the meshes of the cage, and an exhaust blower for carrying the dust away.

4. In a machine for separating fibre from dust and dirt, the combination of a rotary screen cage for receiving the fibre and discharging the cleaned fibre, a partition arranged substantially diametrically in the cage, means for rotating the cage with respect to said partition for carrying the fibre under said partition at the bottom and over it at the top, two rotary beaters in the cage, one at the top for helping break up the fibre and clods and assisting in moving them down the inside of the partition, and one for receiving the fibre and completing the breaking up of the clods.

5. In a dusting machine for fibrous matter, the combination of a stationary casing, a screen cage therein rotatable on an inclined axis, a stationary partition in the cage extending from top to bottom of the cage, a hopper, formed with the partition as one side of it, down which hopper the fibre travels, a space at the bottom of the hopper into which the hopper opens to deliver the fibre into the space, a beater filling the space, one surface of said space consisting of a wall shaped to break up the clods thrown against it by the beater, and means for rotating the beater to throw the fibre and clods against said wall.

6. In a dusting machine for fibrous matter, the combination of a stationary casing, a screen cage therein rotatable on an inclined axis, a stationary partition in the cage extending at an inclination from top to bottom of the cage, a little at one side of the axis of the cage, but spaced therefrom, a hopper formed with a partition as one side of it, down which hopper the fibre travels, a generally circular space at the bottom of the hopper into which the hopper opens to deliver the fibre into the space, a beater substantially filling the space, the top of said space consisting of a wall shaped to break up the clods thrown against it, means for rotating the beater to throw the fibre and clods against said wall, an outlet below the beater, means for receiving the fine particles passing through the screen at said outlet and an exhaust blower for discharging the fine particles from said receiving means.

7. In a wool dusting machine, the combination with a casing, of an inclined rotatable screen cage therein, a beater, means for rotating the beater on its axis, a fixed partition within the cage at one side of the center and extending from top to bottom, means for blowing fibre into the cage at one end above the center near the top of said partition where the rotation of the cage will carry the fibre over the top of said partition, a beater near the partition in position to receive the fibre coming over the top of the partition, said beater being arranged to rotate in a direction to move the fibre down the inside surface of the partition, a second beater having angularly located flat pins located near the bottom of said partition, and a wall above the second beater of serrated construction to break up the clods.

WINFRED W. WINDLE.